US012691025B2

(12) United States Patent
Savioli

(10) Patent No.: US 12,691,025 B2
(45) Date of Patent: Jul. 28, 2026

(54) COLLAPSIBLE LOCKING ROLLATOR WALKER

(71) Applicant: Vive Health, LLC, Naples, FL (US)

(72) Inventor: Gaetano Savioli, Naples, FL (US)

(73) Assignee: Vive Health, LLC, Naples, FL (US)

( * ) Notice: Subject to any disclaimer, the term of this patent is extended or adjusted under 35 U.S.C. 154(b) by 319 days.

(21) Appl. No.: 18/409,712

(22) Filed: Jan. 10, 2024

(65) Prior Publication Data

US 2025/0221881 A1 Jul. 10, 2025

(51) Int. Cl.
*A61H 3/04* (2006.01)

(52) U.S. Cl.
CPC ....... *A61H 3/04* (2013.01); *A61H 2201/0107* (2013.01); *A61H 2201/0161* (2013.01); *A61H 2201/1418* (2013.01); *A61H 2201/1635* (2013.01); *A61H 2201/1676* (2013.01)

(58) Field of Classification Search
CPC ................ A61H 3/04; A61H 2003/046; A61H 2201/0107; A61H 2201/0161; A61H 2201/1418; A61H 2201/1635; A61H 2201/1676
See application file for complete search history.

(56) References Cited

U.S. PATENT DOCUMENTS

| | | | | |
|---|---|---|---|---|
| 5,433,235 A * | 7/1995 | Miric | A61H 3/00 | 135/65 |
| 6,367,823 B1 * | 4/2002 | Miyagi | A61H 3/04 | 280/47.11 |
| 6,729,342 B2 * | 5/2004 | Serhan | A61H 3/00 | 135/67 |
| 7,306,246 B2 * | 12/2007 | Gale | A61H 3/04 | 280/647 |
| 7,703,465 B2 * | 4/2010 | Diamond | A45B 7/00 | 135/74 |
| 8,333,208 B2 * | 12/2012 | Miller | A61H 3/04 | 135/74 |
| 8,998,222 B2 * | 4/2015 | Huang | A61H 3/04 | 280/47.38 |
| 9,839,571 B2 * | 12/2017 | Pan | A47C 4/04 | |
| 10,688,013 B2 * | 6/2020 | Joles | A61H 1/00 | |
| 12,285,380 B2 * | 4/2025 | Burns | A61H 3/008 | |
| 12,605,299 B2 * | 4/2026 | Lewis | A61H 3/008 | |

* cited by examiner

*Primary Examiner* — James M Dolak

(57) ABSTRACT

Disclosed is a foldable locking rollator constructed and arranged to be pivotably operable between an open position and a closed storage position. The folding locking rollator assembly is comprised of a support structure having two spaced apart front support members and two rear support members. Each rear support member is pivotally attached to the ends of the front support members with hinge assemblies. The front support members each have a sliding joint member constructed and arranged to slide between the front support members ends. A set of crossbar members are pivotally connected at a predetermined point in an X-configuration. At least one sliding joint member is comprised of a locking mechanism constructed and arranged to be hand operated with a lever by the user.

12 Claims, 13 Drawing Sheets

Detail B

COLLAPSIBLE LOCKING ROLLATOR WALKER

FIELD OF THE INVENTION

This disclosure relates generally to a rollator walker, more specifically, a collapsible locking rollator walker that is hand operated by the user for ease of operation and improved storage.

BACKGROUND OF THE INVENTION

The aging population often suffers from a multitude of conditions that result in decreased mobility and stability. However, no one wants to voluntarily give up freedom and independence. Mobility aids allow people to maintain an independent lifestyle but need help getting around. Walkers and rollators are two popular devices that aid people who are still able to walk (i.e., don't require a wheelchair) but need assistance. A walker includes a four-legged frame that allows a person to lean on it for balance, support, and rest. A rollator is sometimes called a "wheeled walker" and consists of a frame with at least two wheels in the front as well as two back legs. It may be used for patients who need a walker only for balance but for weight-bearing. A variety of rollators exist in the marketplace to assist people with decreased mobility as they maneuver through their daily routines. Ideally a rollator should be lightweight, compact and safe.

U.S. Pat. No. 8,998,222 discloses a foldable rollator that includes: a main support frame including two spaced-apart front support rods; a rear support frame including two spaced-apart rear support rods pivotally coupled to the front support rods, respectively; a plurality of wheels respectively installed on the main support frame and the rear support rods for rolling on the ground; an intermediate support frame coupled to the main support frame and the rear support frame, including a front support sub-frame pivotally coupled between the front support rods and a rear support sub-frame pivotally coupled between the rear support rods, the front and rear support sub-frames being further pivotally coupled to an axle; a seat unit disposed atop the intermediate support frame; and a backrest unit pivotally coupled to the axle.

U.S. Pat. No. 9,839,571 discloses a foldable rollator, including a folding device, a first rollator body and a second rollator body arranged in a mirror image orientation with respect to one another. The first and second rollator bodies are movably connected with each other through the folding device. Each of the first and second rollator bodies include a gripping part including a supporting bar, a drawing device, and a supporting fastener. The drawing device is positioned on the supporting bar away from the supporting fastener. The gripping part is rotatably connected to the supporting fastener. The supporting fastener is provided with a first and second clamping grooves and the gripping part is orientated perpendicular to and fixed to the supporting fastener when the drawing device is clamped in the first clamping groove. The gripping part is rotationally connected to the supporting fastener when the drawing device is clamped in the second clamping groove.

Presently, what is lacking in the prior art is a lightweight folding rollator assembly with a reliable but also easy to operate locking mechanism.

SUMMARY

The present disclosure is an improved collapsible rollator assembly having an improved locking mechanism that is easy to operate while also securing the rollator to prevent it from rolling when the locking mechanism is engaged.

In one embodiment the rollator includes a support structure having two spaced apart front support members that terminate in a pair of wheels and two rear support members, i.e., rearward facing legs. Each of the rear support members are pivotally attached to portions of the front support members, for example by hinge assemblies. The front support members each have a sliding joint member constructed and arranged to slide along the front support members along a portion of its length. A set of crossbar members are pivotally connected at one end to a predetermined point on the front support members in an X-configuration. The set of crossbar members are each pivotally connected at their opposite ends to one of the sliding joint members. Pivotally attached to each sliding joint member and pivotable attached to the two rear support members are a stabilizing support member.

At least one sliding joint member includes a locking mechanism constructed and arranged to be hand operated with a lever by the user. Attached to the end of the front support members are handles. The support structure assembly is constructed and arranged to be pivotably operable between an open position and a closed storage position.

BRIEF DESCRIPTION OF THE DRAWINGS

The foregoing features may be more fully understood from the following description of the drawings. Various aspects of at least one embodiment are discussed below with reference to the accompanying figures, which are not necessarily drawn to scale, emphasis instead being placed upon illustrating the principles disclosed herein. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the claimed invention. Like numbers in the figures denote like elements. For purposes of clarity, not every component may be labeled in every figure.

DETAILED DESCRIPTION

Figure 1:
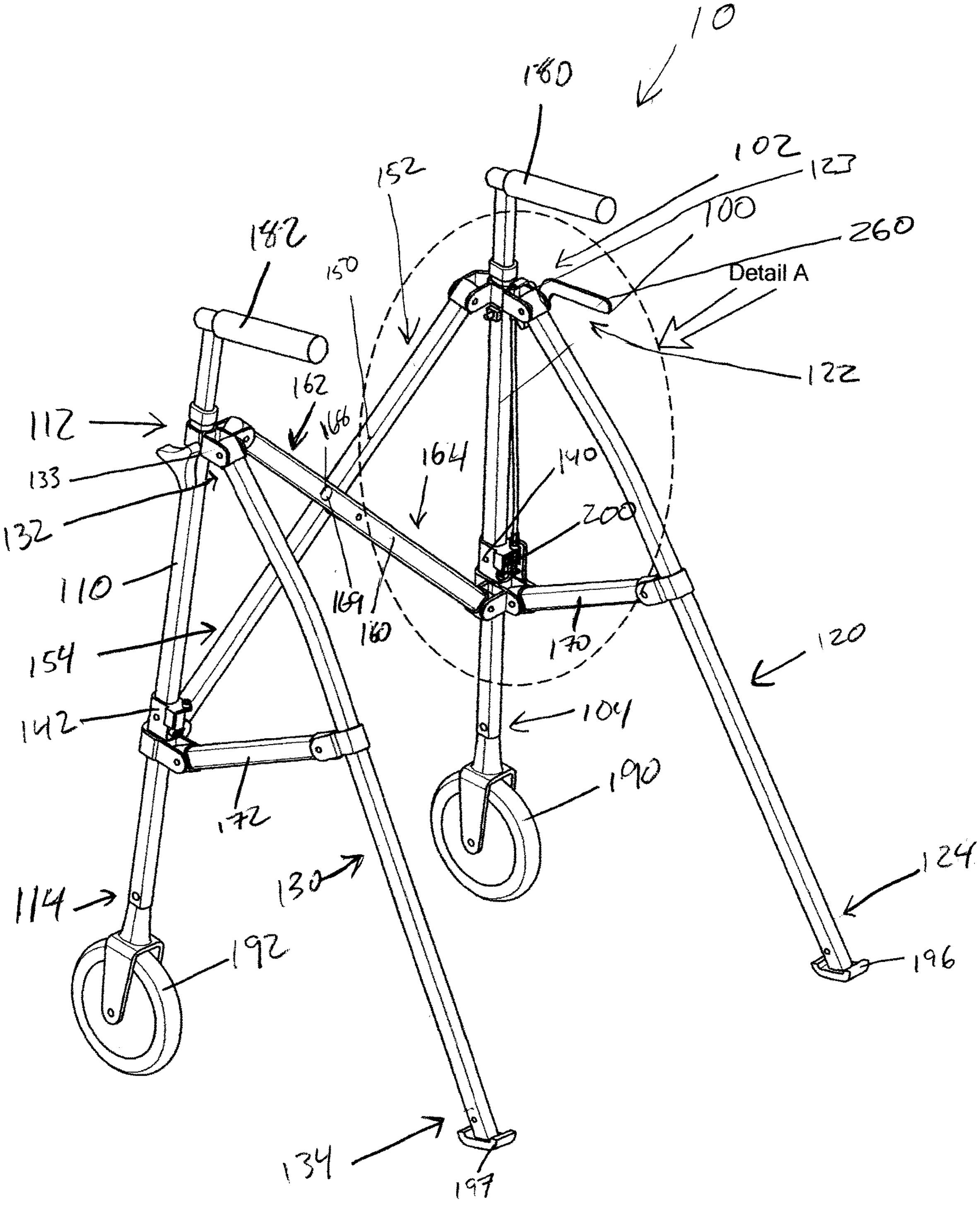
FIG. 1 is a rear perspective view of the foldable locking rollator assembly according to the present disclosure in an open position, including Detail A.

The examples of the device discussed herein are not limited in application to the details of construction and the arrangement of components set forth in the following description or illustrated in the accompanying drawings. It will be understood to one of skill in the art that the apparatus is capable of implementation in other embodiments and of being practiced or carried out in various ways. As such, the present disclosure is to be considered an exemplification and is not intended to limit the invention to the specific embodiments illustrated. Also, the phraseology and terminology used herein is for the purpose of description and should not be regarded as limiting. Any references to examples, embodiments, components, elements or acts of the apparatus described herein referred to in the singular may also embrace embodiments including a plurality, and any references in plural to any embodiment, component, element, or act herein may also embrace embodiments including only a singularity (or unitary structure). Likewise, unitary structures may be configured from multiple parts. References in the singular or plural form are not intended to limit the presently disclosed apparatus, its components, acts, or elements. The use herein of "including," "comprising," "having," "containing," "involving," and variations thereof is meant to encompass the items listed thereafter and equivalents thereof as well as additional items. The word "or" is construed as inclusive so that any terms described using "or" may indicate any of a single, more than one, and all of the described terms.

Referring now to the Figures, disclosed is a foldable rollator assembly 10 comprised of a support structure having two spaced apart front support members 100 and 110 each having a proximal end 102, 112, a distal end 104,114 and two rear support members 120, 130 each having a proximate end 122, 132 and distal end 124, 134. Each of the rear support members 120, 130 proximate ends 102, 112 are pivotally attached to the proximal ends 102, 112 of the front support members 100, 110 with hinge assemblies 123 and 133. The front support members 100, 110 each having a sliding joint member 140, 142 constructed and arranged to slide between the front support members proximal 102, 112 and distal ends 104, 114. A set of crossbar members 150, 160 are pivotally connected at a predetermined location 169, each crossbar member 150, 160 having a proximal end 152, 162 and a distal end 154, 164, respectively.

With continued reference to the Figures, the proximal ends 152, 162 of the set of crossbar members are pivotally connected to proximal ends 102, 112 of the front support members 100, 110 and the distal ends 154, 164 of the crossbar members 150, 160 that are pivotally attached to the sliding joint members 140, 142. Pivotally attached to each sliding joint member 140, 142 and pivotally attached to the two rear support members 120, 130 are two stabilizing support members 170, 172. At least one of the sliding joint members 140, 142 includes a locking mechanism 200 constructed and arranged to be hand operated with a lever 260 by the user. Attached to the proximal ends 102, 112 of each of the front support members are handles 180, 182 that are grasped by the user during use. Attached to the distal ends 104, 114 of each of the front support members 100, 110 are at least one wheel 190, 192. The support structure assembly is constructed and arranged to be pivotably operable between an open position and a closed storage position.

Referring now to FIG. 1, in this exemplary embodiment of the present disclosure, the foldable rollator assembly 10 is fully open in an upright and locked position. At the distal ends of the rear support members 120,130 are slidable feet 196, 197. The slidable feet 196, 197 are constructed and arranged with a material having a predetermined co-efficient of static friction to facilitate movement of the rollator assembly 10. In other embodiments, it is contemplated that wheels could be attached to the distal ends of rear support members 120, 130 similar to the front support members.

Figure 2:
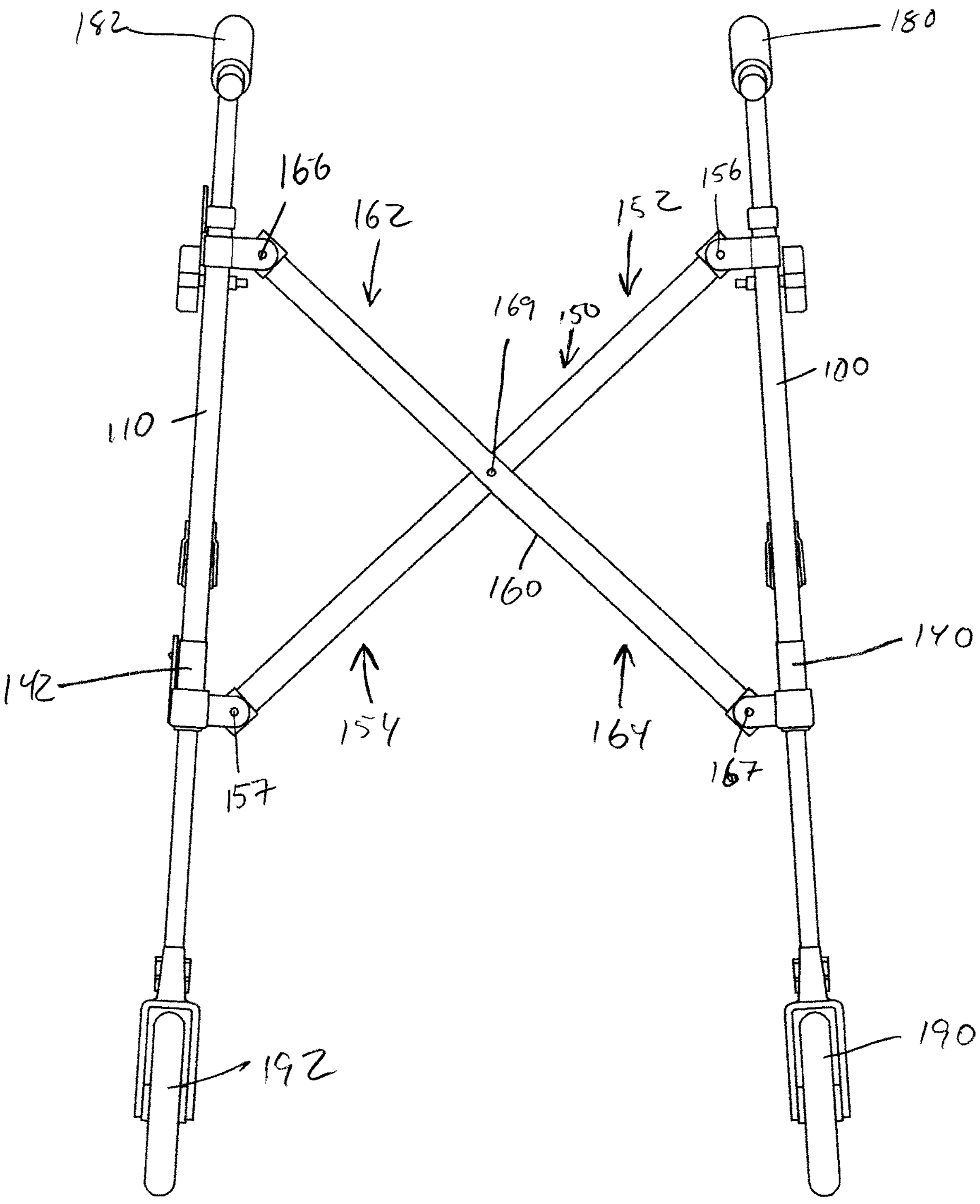
FIG. 2 is a front view of the embodiment of FIG. 1.
Figure 7:
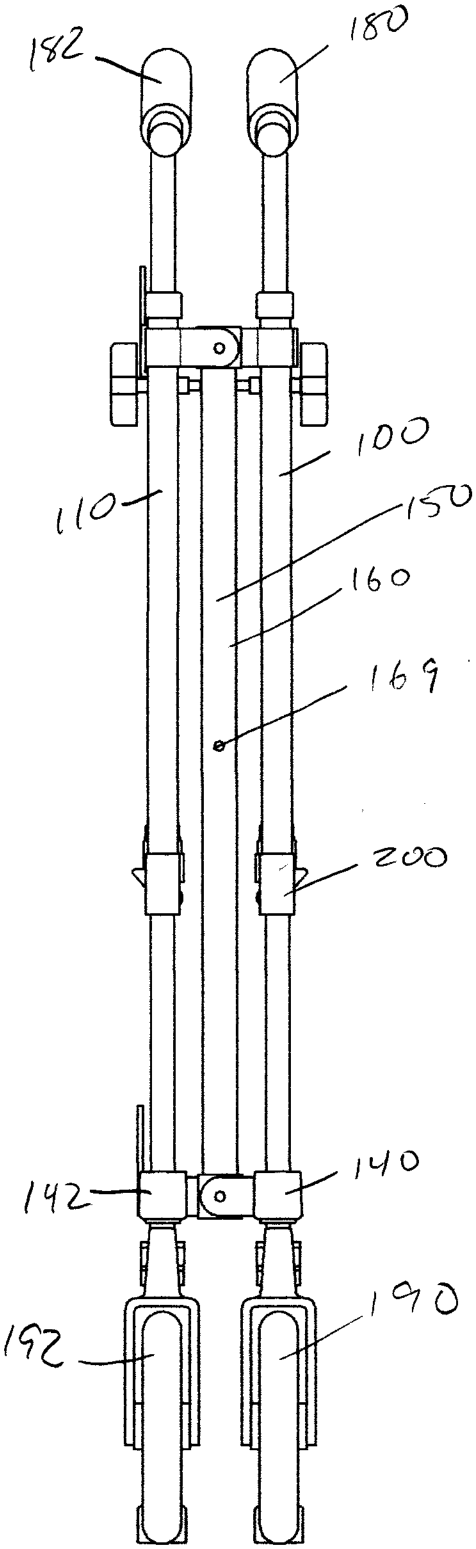
FIG. 7 is a front view of the embodiment of FIG. 1 in a closed position.

Referring now to FIG. 2, in the present embodiment, the proximal ends 102, 112 of the front support members 100, 110 are handles 180, 182 that are designed to be grasped by the user. Wheels 190, 192 are disposed at the distal ends 104, 114 of the front support members 100, 110. Crossbar members 150 and 160 are pivotably attached at a midpoint 168 with a fastener 169 constructed and arranged to pivot through a predetermined range of motion from an open position (FIG. 1) to a closed position (FIG. 7). The crossbar members 150 and 160 are pivotally attached to front support members 100 and 110 in an X-configuration. Support member 150 is pivotably attached to front support member 100 with pivot assembly 156 and to front support member 110 with pivot assembly 157. Support member 160 is pivotably attached to front support member 100 with pivot assembly 167 and to front support member 110 with pivot assembly 156. Support members 150 and 160 are dimensioned to be able to deploy the front support members 100 and 110 from a collapsed, closed storage position (FIG. 7) to a fully open operational position (FIG. 1).

Figure 3:
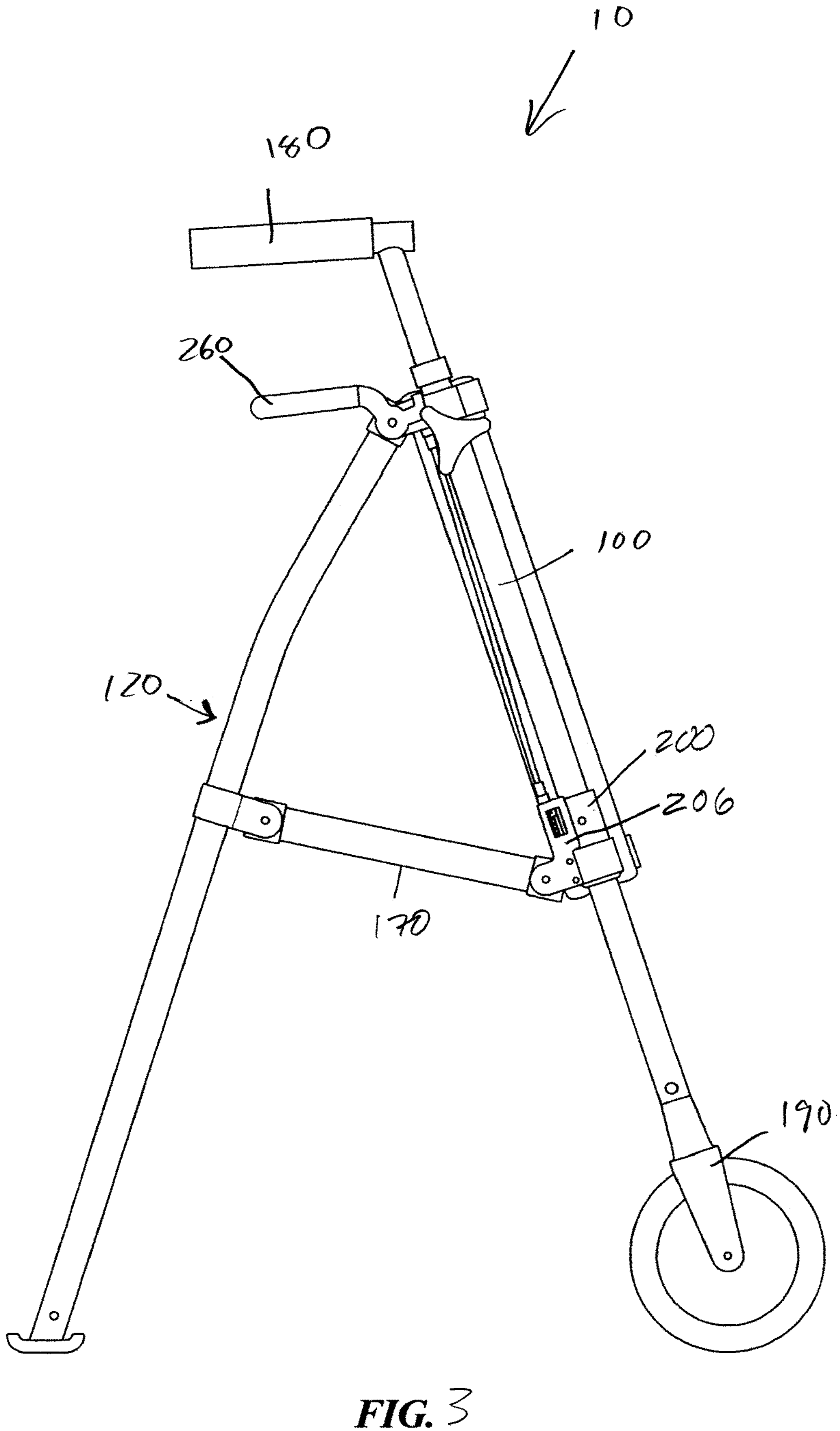
FIG. 3 is a side perspective view of the embodiment of FIG. 1.

The present disclosure further includes at least two rear support members 120 and 130 that are angle rearwardly in the present embodiment. At least two additional stabilizing members 170 and 172 are pivotably attached between front support members 100 and 110 and rear support members 120 and 130. FIG. 3 is a side view exemplary embodiment of the positioning of stabilizing member 170 between front support member 100 and rear support member 120.

Figure 9:
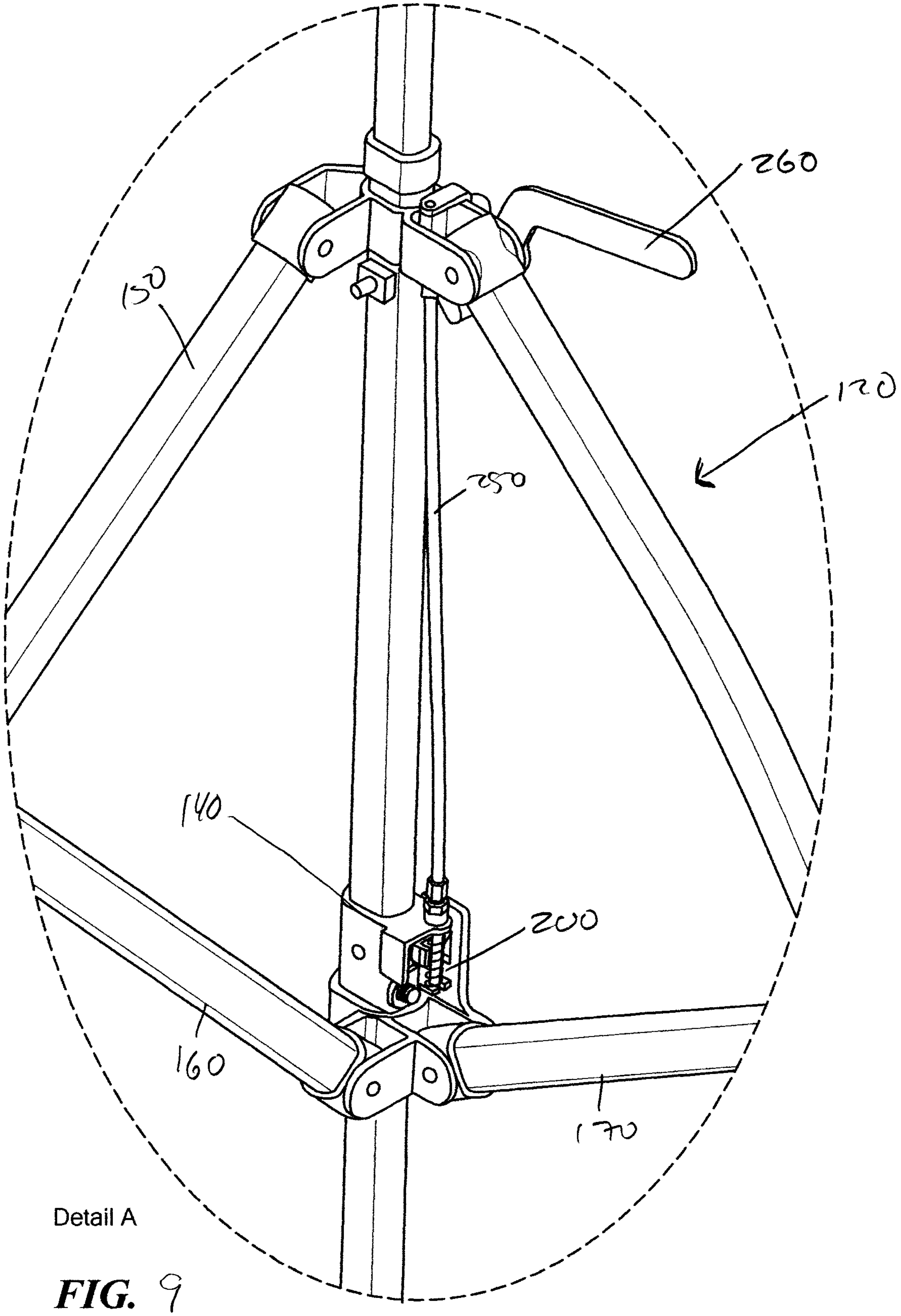
FIG. 9 is the enlarged Detail A view from FIG. 1.
Figure 10:
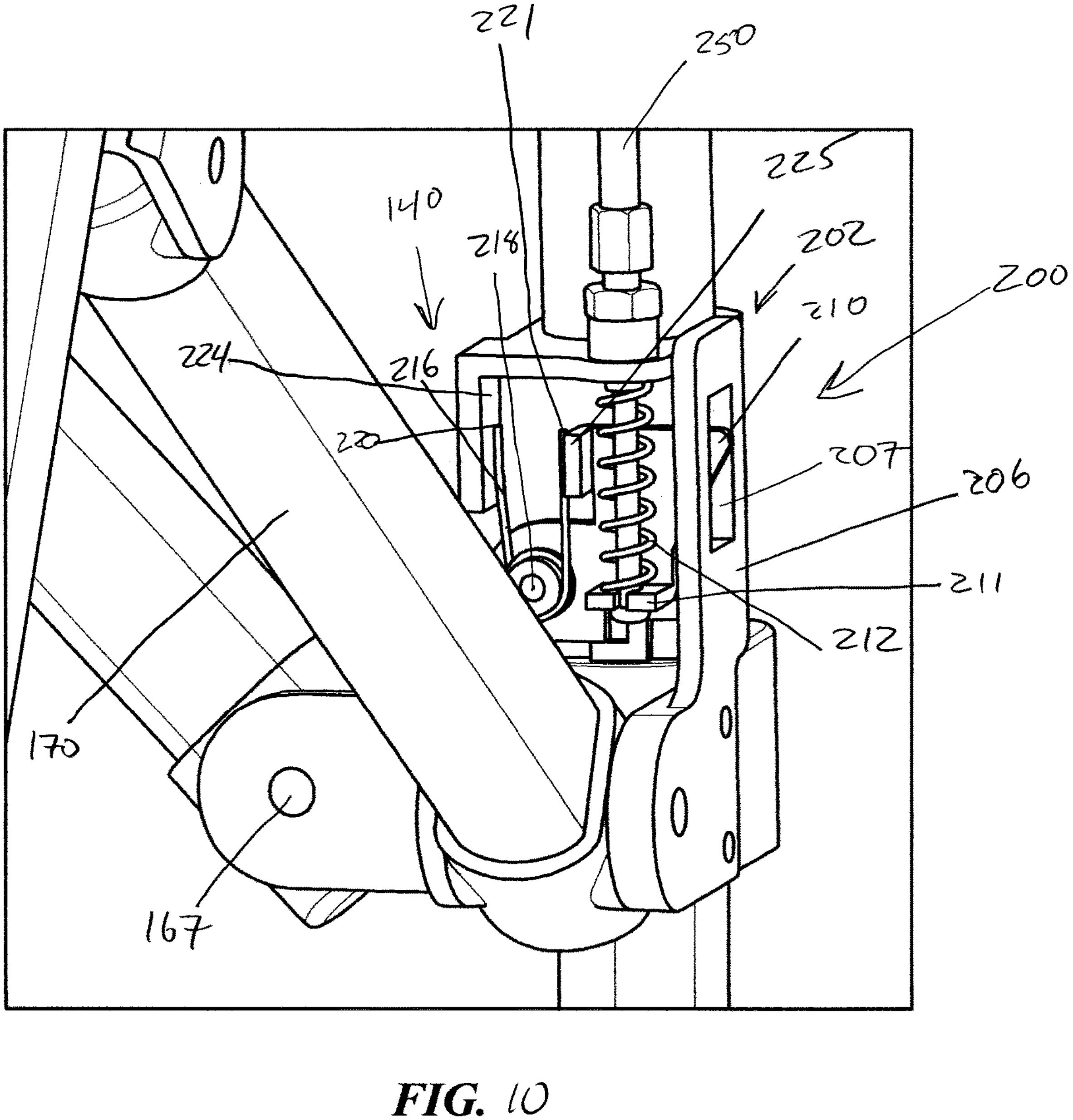
FIG. 10 is an enlarged front perspective view of the locking mechanism of Detail A of the embodiment of FIG. 1.
Figure 11:
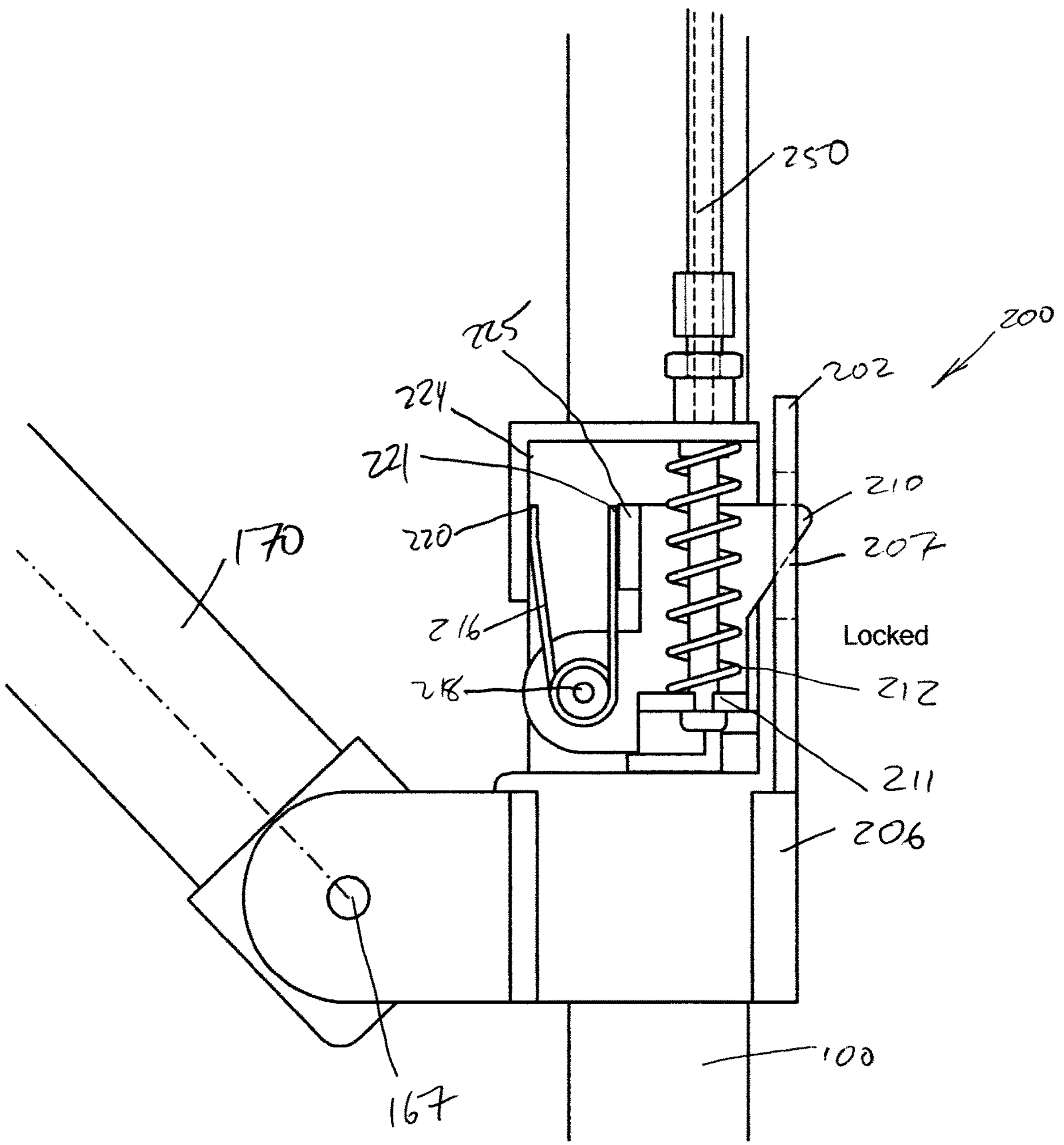
FIG. 11 is an enlarged front perspective view of the locking mechanism of the present disclosure of Detail A of the embodiment of FIG. 10 in the locked position.
Figure 12:
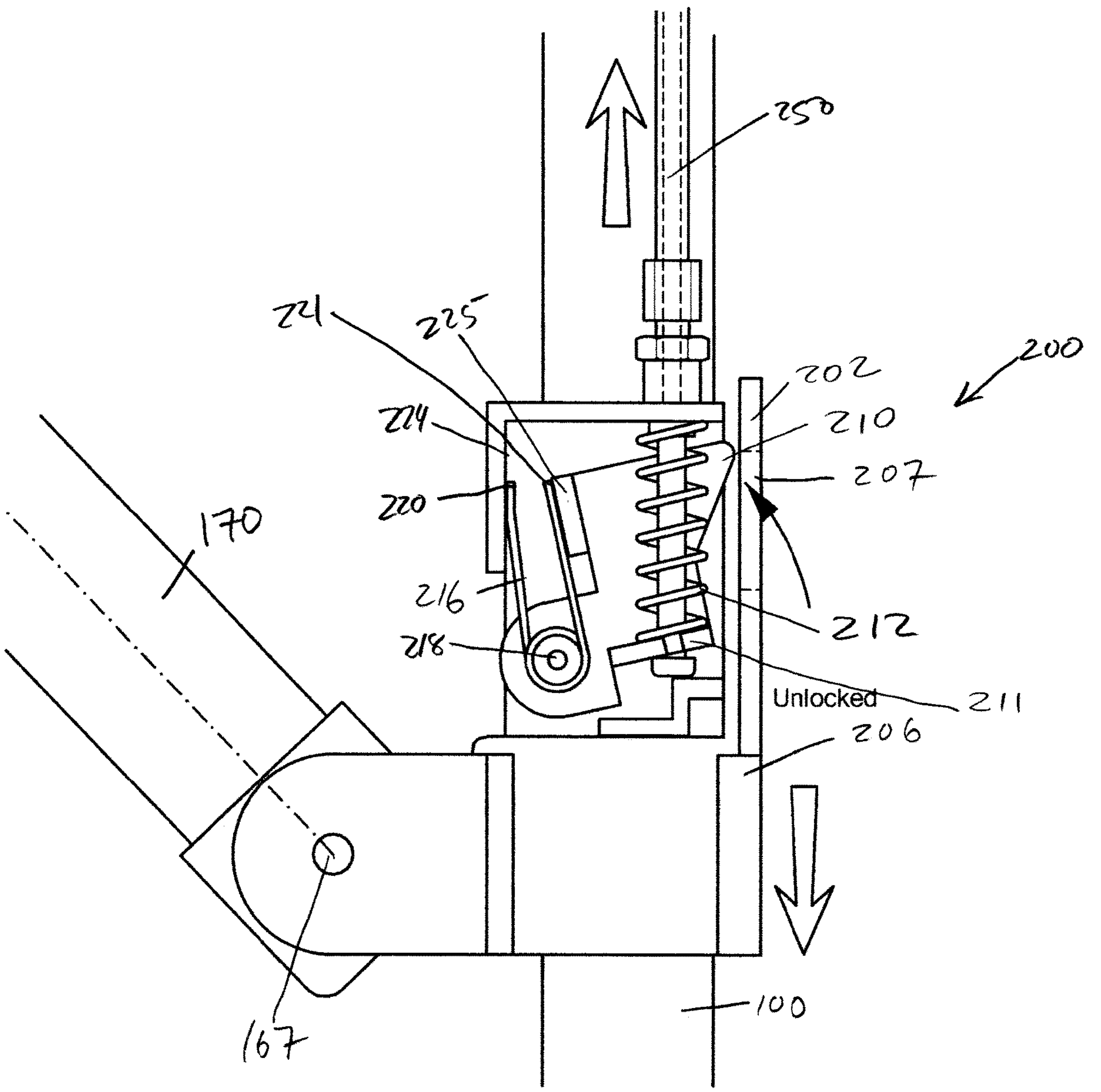
FIG. 12 is an enlarged front perspective view of the locking mechanism of the present disclosure of Detail A of the embodiment of FIG. 10 in the unlocked position.
Figure 13:
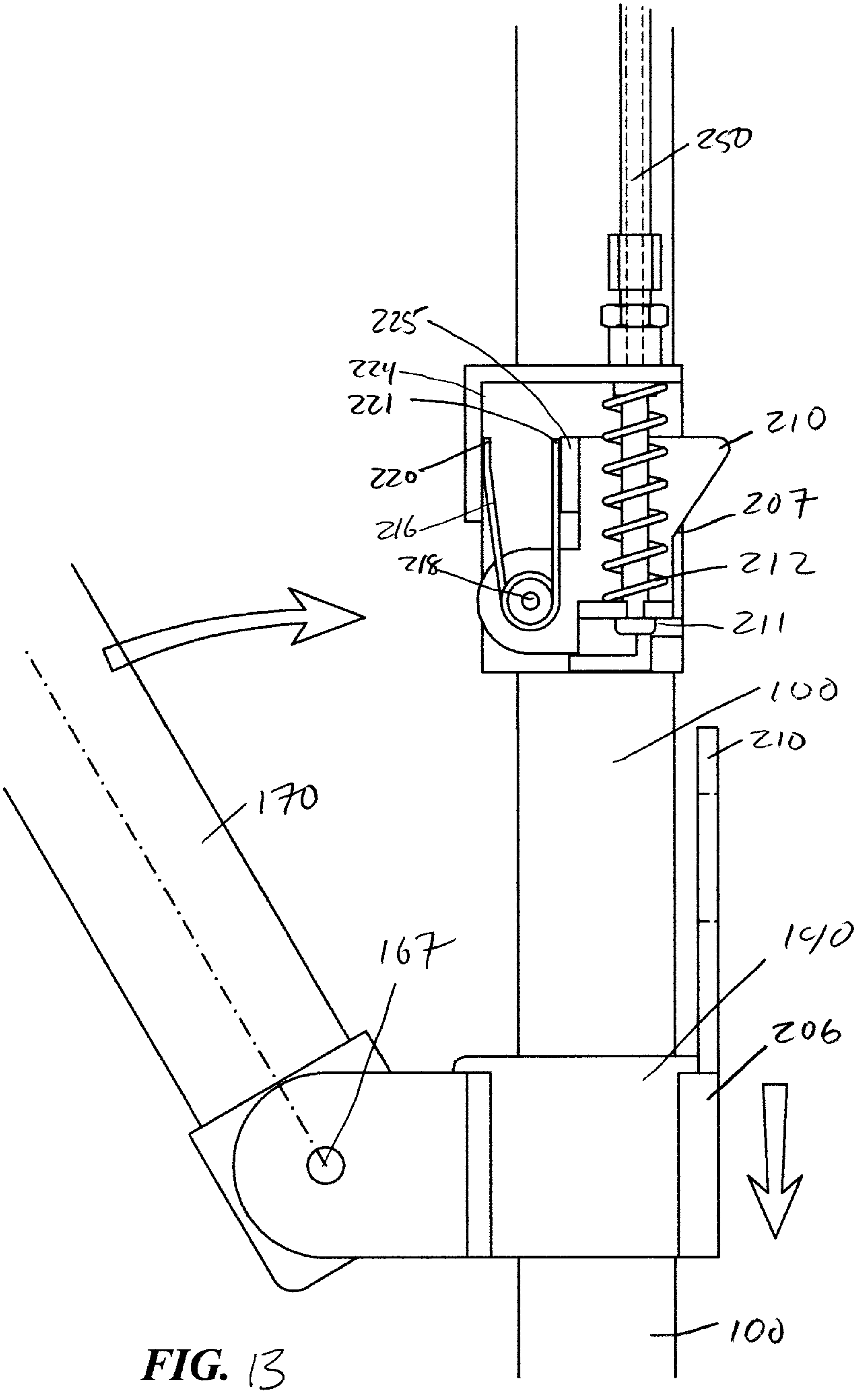
FIG. 13 is a front perspective view of the sliding joint member released from the locking mechanism of the embodiment of FIG. 10.

In an exemplary embodiment, the rollator assembly 10 is capable of being locked in the open, operational position. As best shown in FIGS. 9-10, foldable rollator assembly 10 has a sliding joint member 140 that cooperates with locking mechanism 200 that is comprised of lock assembly 202. Lock assembly 202 has an outer support plate 206 with an aperture 207. Support plate 206 is attached to sliding joint member 140. A cam 210 is pivotably attached to the front support member 100 with a fastener 218 and is constructed and arranged to pivot through the aperture 207 between a locked position and unlocked position. A first spring 212 is attached to the cam 210 and is constructed and arranged to rotate said cam between a locked and unlocked position. The first spring 212 is positioned between the top of the lock assembly 202 and a predetermined edge of said cam 211. A cable assembly 250 of a predetermined length is positioned within the first spring 212 and fixedly attached to a predetermined edge of the cam with fastener 211 of the cam 210. The cable assembly 250 has a handle 260 attached to the opposite end, wherein the cable assembly 250 is constructed and arranged to be operable for moving said cam 210 between a locked and unlocked position. A second spring 216 is constructed and arranged with a spring bias of a magnitude required to return the cam to a locked position.

In the exemplary embodiment, the second spring 216 is a torsion spring having ends 220 and 221. Spring end 220 is place in a stationary position contacting side wall 224 of locking assembly 202. Spring end 221 is positioned in contact with protrusion 225 that further comprises cam 210. The torsion spring 216 is constructed and arranged with sufficient spring tension to return cam 210 to the locked position when the user releases handle 260 thereby releasing the tension on spring 212 required to pull the cam 210 into the open position.

Figure 4:
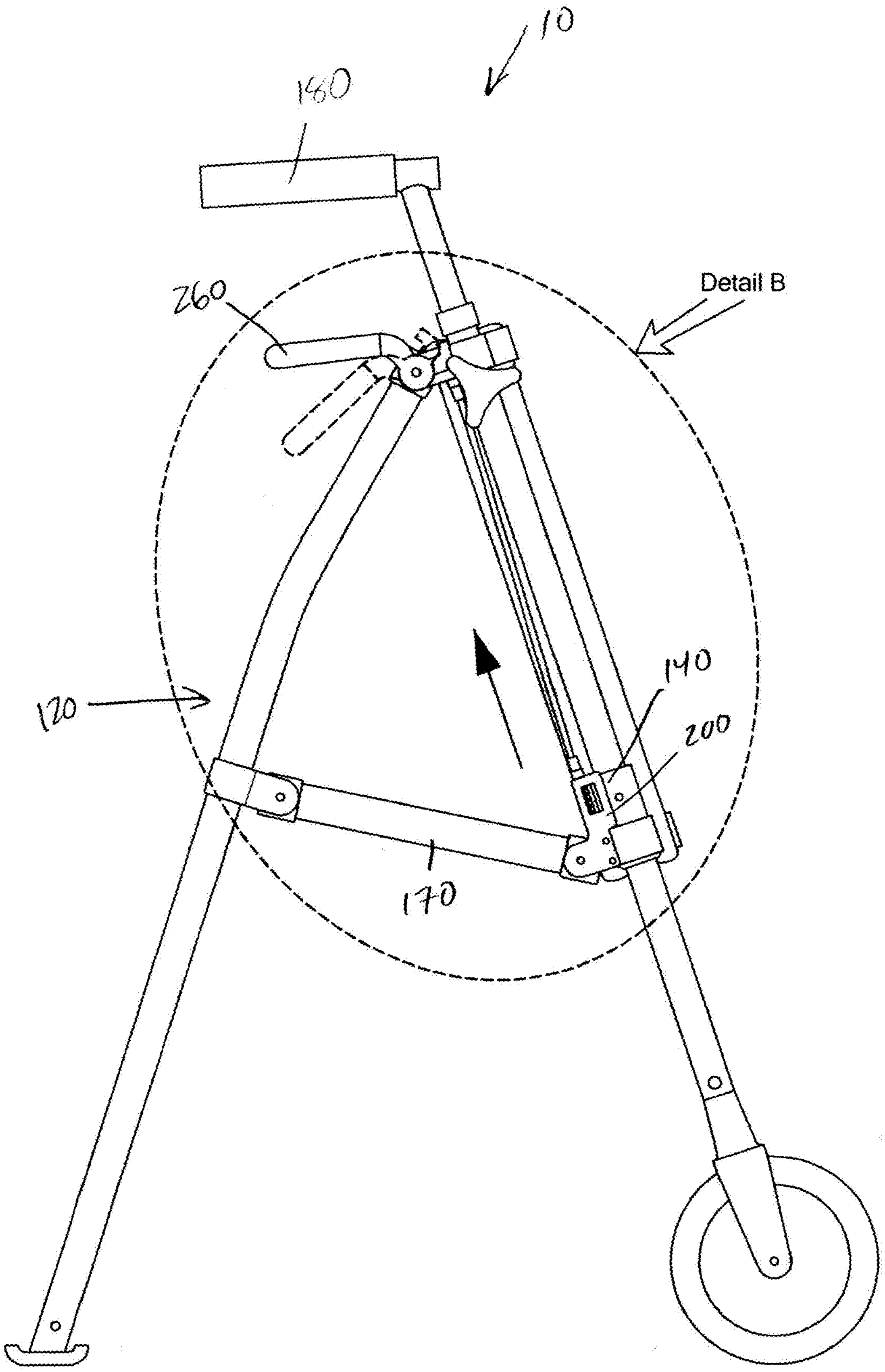
FIG. 4 is a side perspective view of the embodiment of FIG. 3 including Detail B.
Figure 5:
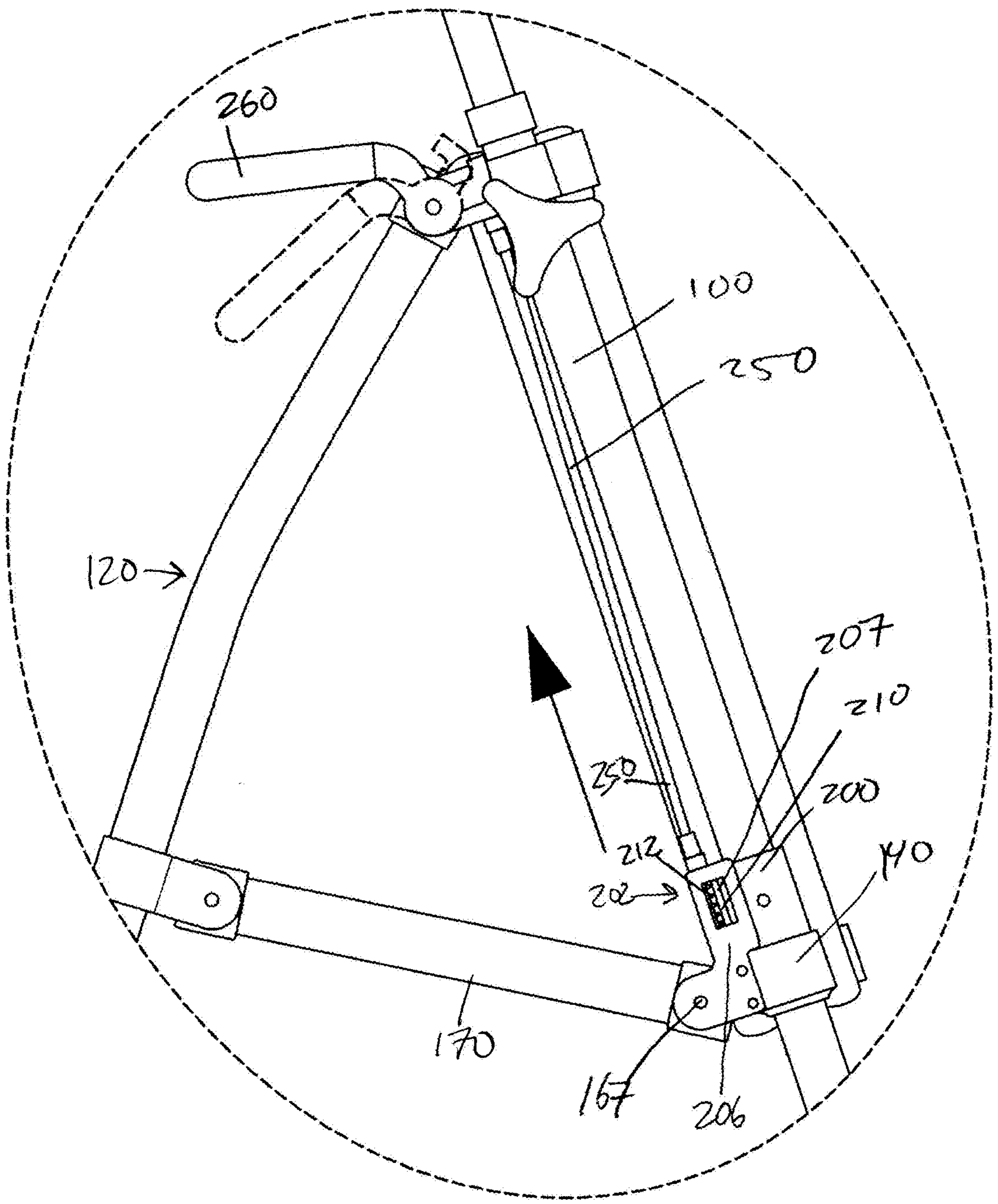
FIG. 5 is an enlarged view of Detail B view of FIG. 4.
Figure 6:
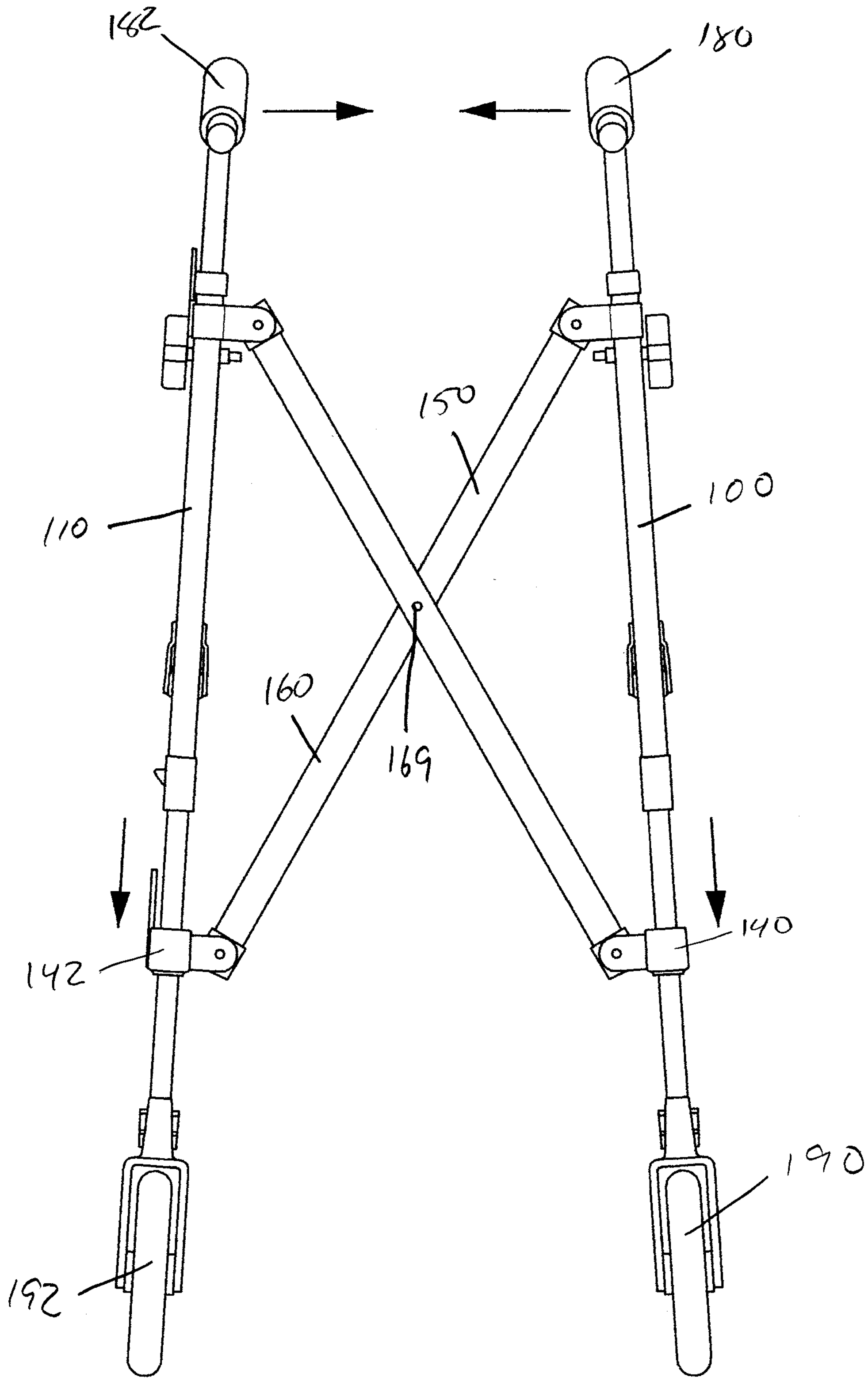
FIG. 6 is a front view of the embodiment of FIG. 1 transitioning from an open position to a closed position.
Figure 8:
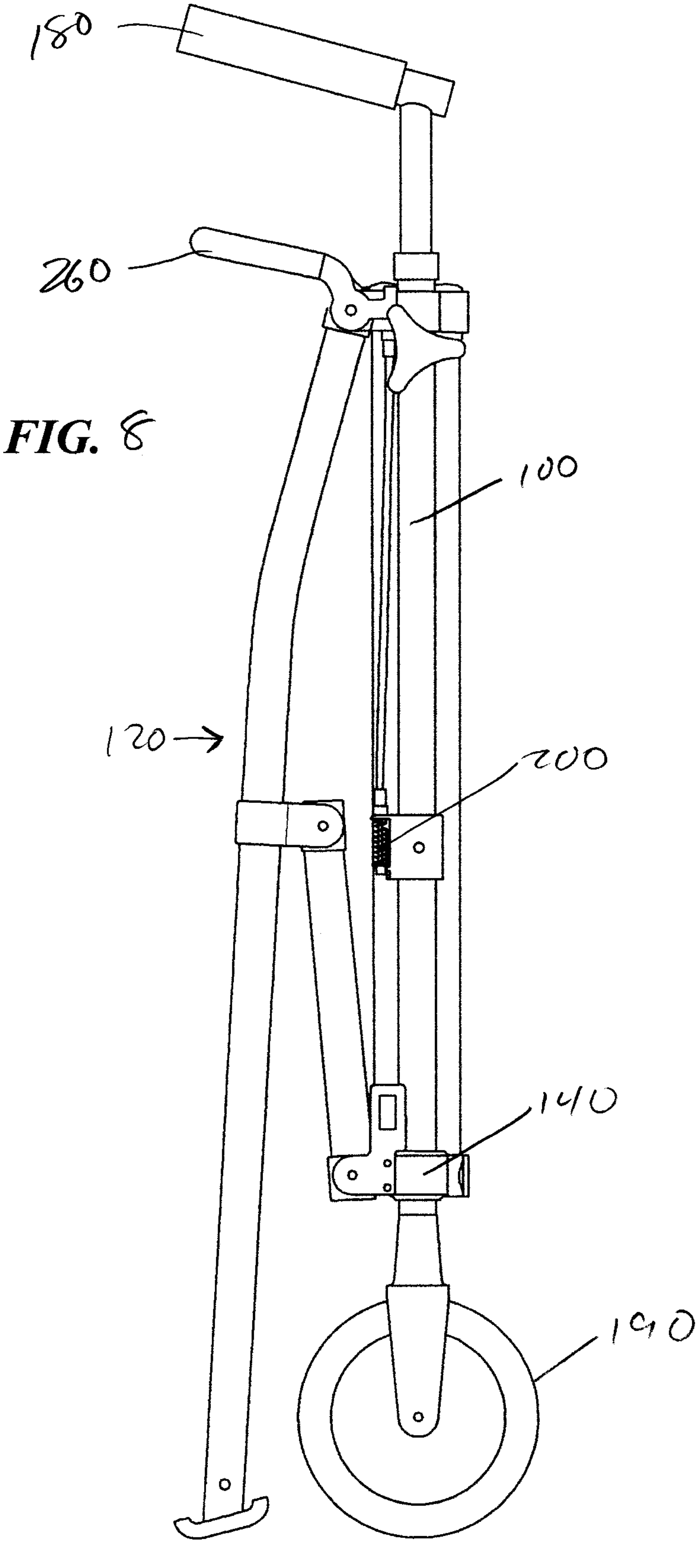
FIG. 8 is side perspective of the embodiment of FIG. 6.

A user that desires to unlock the presently disclosed rollator assembly, depresses handle 260, which is mechanically attached to locking mechanism 200 as described herein, thereby releasing the rollator assembly 10 from the locked position. FIG. 4 depicts the direction along which sliding joint member 140 moves in relation to front support member 100 when transitioning from the operational or open position to a collapsed or closed storage position. Referring now to FIGS. 6-8, after the locking mechanism 200 is released sliding joint members 140 and 142 slide downwards towards the distal end of the front support members 100 and 110 and the crossbar members 150 and 160 fold inward toward each other. The crossbar members are attached so that in a storage position they are stacked upon each other. The two rear support members 120 and 130 and the two stabilizing support members 170 and 172 are constructed and arranged to fold in a compact storage configuration wherein those components are stored in a plane parallel to front support members 100 and 110.

When an operator desires to unlock the rollator assembly for closure, the operator depresses the cable assembly handle 260, which is positioned at the proximate end 102 of the front support member 100. The assembly constructed and arranged for a user to operate the foldable rollator assembly from the standing position. From a standing position, a user is able to release the locking mechanism 200 with one hand and easily maneuver the rollator to the closed position. The positioning of the cable assembly handle 260 facilitates the operation of the rollator assembly by a user without having to bend over. The ease of operation is desirable for an elderly person, for example, as those individuals often have diminished strength and mobility. The cable assembly includes a cable that is dimensioned so that upon depression of the handle 260 the cable retracts the cam 210 the predetermined distance to rotate the cam through the aperture 207 into the unlocked position. The cable is constructed and arranged to return to its original length through attachment to spring 212.

The support structures of the present disclosure are constructed and arranged to be stored in a compact configuration. Upon release of the locking mechanism 202, support plate 206 which is fixedly attached to sliding joint member 140, slides towards the distal end of front support structure 100. The other half of the rollator assembly has identical support structures and the entire apparatus can be compressed into a compact profile for storage.

The locking mechanism is constructed and arranged to lock the foldable rollator assembly in the operational position. It is also contemplated that the rollator assembly can be locked in the storage position as well. (not shown).

Since the contemplated users of the disclosed invention are people with limited mobility and potentially limited strength, all the support structure components are contemplated to be constructed of lightweight but durable material. One of ordinary skill in the art would appreciate that support structures need to be lightweight but strong enough to support the entire weight of the contemplated user. Material compositions would be adjusted based on the contemplated load on the rollator based upon the height and weigh of individual users. In one embodiment, the support members are hollow tubular structures constructed and arranged to cooperate with accessories such as wheels and handles. For example, the handles 180 and 182 can be removably attached from the front support members 100 and 110 and the wheels can be removably attached from front support members 100 and 110 respectively. The removability of items such as handle and wheels allows for a more compact storage profile.

Having thus described several aspects of at least one disclosed example, it is to be appreciated that various alterations, modifications, and improvements will readily occur to those skilled in the art, without departing from the spirit and scope of the invention as defined by the appended claims. Therefore, the claims are not to be limited to the specific example(s) depicted herein. For example, the features of one example disclosed above can be used with the features of another example. Furthermore, various modifications and rearrangements of the parts may be made without departing from the spirit and scope of the underlying inventive concept. Such alterations, modifications, and improvements are intended to be part of this disclosure and are intended to be within the scope of the examples discussed herein. Thus, the details of these components as set forth in the above-described examples should not limit the scope of the claims.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed:

1. A foldable rollator assembly comprising:

a support structure comprised of two spaced apart front support members each having a proximate end and a distal end and two rear support members each having a proximate end and a distal end; said proximate ends of said two rear support members pivotally attached to said proximate ends of said front support members, said front support members each having a sliding joint member that slides between said front support members proximate ends and distal ends, a set of crossbar members pivotally connected at a connection point each crossbar member having a proximate end and a distal end, said proximate ends of said set of crossbar members pivotally connected to said proximate ends of said front support members and said distal ends of said crossbar members pivotally attached to said sliding joint members, and pivotably attached to said two rear support members are two stabilizing support members, at least one of said sliding joint members is comprised of a locking mechanism operated by a user, attached to said proximate ends of said front support members are handles, attached to said distal ends of said front support members are at least one wheel, wherein said support structure is pivotably operable between an open locked position and a closed storage position, wherein said locking mechanism is comprised of an outer support plate with an aperture, a cam pivotably attached to said sliding joint member wherein said cam pivots through said aperture between a locked position and an unlocked position, a first spring is attached to said cam to rotate said cam between said locked position and said unlocked position, and a second spring having a spring bias of a magnitude required to return said cam to the locked position.

2. The foldable rollator assembly of claim 1, wherein said first spring is positioned between a top of said lock assembly and an edge of said cam, a cable assembly is positioned within said first spring and is attached to said edge of said cam, said cable assembly has a handle attached to an opposite end, wherein said cable assembly is operable for moving said cam between a locked and unlocked position.

3. The foldable rollator assembly of claim 2, wherein said cable assembly handle is positioned at said proximate end of said front support member to enable, a user to operate said foldable rollator assembly from the standing position.

4. The foldable rollator assembly of claim 1, wherein said support structure is stored in a compact configuration.

5. The foldable rollator assembly of claim 1, wherein said locking mechanism is constructed and arranged to locks said foldable rollator assembly in the operational position and the storage position.

6. The foldable rollator assembly of claim 1, wherein said front support members are hollow tubular structures.

7. The foldable rollator structure according to claim 1, wherein said handles are removably attached to said front support members, thereby allowing a more compact storage profile.

8. The foldable rollator structure according to claim 1, wherein said at least one wheel is removably attached to said support member, thereby allowing a more compact storage profile.

9. A foldable rollator assembly comprising:

a support structure that includes two spaced apart front support members having proximate ends and distal ends and two rear support members having proximate ends and distal ends, the proximate ends of the two rear support members pivotally attach to the proximate ends of the front support members, the front support members include sliding joint members that slide between the proximate ends and the distal ends of the front support members, and the sliding joint members include a locking mechanism;

crossbar members that include proximate ends and distal ends, the proximate ends of the cross members pivotally connect to the proximate ends of the front support members, the distal ends of the crossbar members pivotally connect to the sliding joint members;

handles attached to the proximate ends of the front support members; and wheels attached to the distal ends of the front support members, wherein the support structure pivotably operates between an open locked position and a closed storage position, wherein the locking mechanism include a lock assembly having an outer support plate with an aperture, a cam pivotably attached to the sliding joint member to pivot through the aperture between a locked position and an unlocked position, a first spring attaches to the cam to rotate the cam between the locked position and the unlocked position, and a second spring with a spring bias of a magnitude to return the cam to the locked position.

10. The foldable rollator assembly of claim 9, wherein the first spring is positioned between a top of the lock assembly and an edge of the cam, a cable assembly is positioned within the first spring and attaches to the edge of the cam, and the cable assembly moves the cam between a locked and unlocked position.

11. A foldable rollator assembly comprising:

a support structure including front support members that are spaced apart and have proximate ends and distal ends and rear support members that have proximate ends and distal ends, the proximate ends of the rear support members pivotally attach to the proximate ends of the front support members, the front support members include a sliding joint member that slides between the proximate ends and the distal ends of the front support members, and the sliding joint member includes a locking mechanism;

crossbar members include proximate ends and distal ends, the proximate ends of the crossbar members pivotally connect to the proximate ends of the front support members and the distal ends of the crossbar members pivotally connect to the sliding joint member; and handles and wheels that attach to the front support members, wherein the support structure pivotably operates between an open locked position and a closed storage position, wherein the locking mechanism includes a lock assembly that includes an outer support plate with an aperture, a cam pivotably attaches to the sliding joint member to pivot through the aperture between a locked position and an unlocked position, a first spring attaches to the cam to rotate the cam between the locked position and the unlocked position, and a second spring includes a spring bias that returns the cam to the locked position.

12. The foldable rollator assembly of claim 11, wherein the first spring is positioned between a top of the lock assembly and an edge of the cam, a cable assembly is positioned within the first spring and attaches to the edge of the cam, and the cable assembly moves the cam between a locked and unlocked position.

* * * * *